United States Patent [19]

Vranish

[11] Patent Number: 5,409,431
[45] Date of Patent: Apr. 25, 1995

[54] CARRIER-LESS, ANTI-BACKLASH PLANETARY DRIVE SYSTEM

[75] Inventor: John M. Vranish, Crofton, Md.

[73] Assignee: The United States of America as represented by the Administrator of the National Aeronautics and Space Administration, Washington, D.C.

[21] Appl. No.: 147,276

[22] Filed: Nov. 2, 1993

[51] Int. Cl.⁶ .............................................. F16H 1/28
[52] U.S. Cl. ................................................... 475/342
[58] Field of Search ............................... 475/341, 342

[56] References Cited

U.S. PATENT DOCUMENTS

| | | | |
|---|---|---|---|
| 4,459,876 | 7/1984 | Kohler et al. | 74/788 |
| 4,799,396 | 6/1989 | Ito | 74/410 |
| 4,882,943 | 11/1989 | Pipon et al. | 475/342 |
| 5,078,665 | 1/1992 | Castellani | 475/342 |
| 5,240,462 | 8/1993 | Mochizuki et al. | 475/342 |

Primary Examiner—Dirk Wright
Attorney, Agent, or Firm—Paul S. Clohan, Jr.; R. Dennis Marchant; Guy M. Miller

[57] ABSTRACT

A carrier-less, anti-backlash planetary gear system that has an input sun gear, a force-balancing and planet-alignment "speeder" gear above the sun gear, a split ring gear that has a fixed lower ring gear coaxial with the sun gear and a rotating upper ring gear also coaxial with the sun gear. A preload bolt is used for securing the split ring gears together. Within the split ring gear is an even number of planet gears between the split ring gear and the sun gear. Each planet gear consists of an upper planet gear, and lower planet gear with the upper and lower planet gears splined together and pushed apart by a spring which causes separation and relative twist between the upper and lower planet gears. The lower planet gear meshes with the input sun gear and the fixed ring gear while the upper planet gear is driven by the lower planet gear and meshes with the rotating ring gear.

8 Claims, 5 Drawing Sheets

CARRIER-LESS, ANTI-BACKLASH PLANETARY DRIVE SYSTEM

The invention described herein was made by an employee of the United States Government, and may be manufactured and used by or for the Government for governmental purposes without the payment of any royalties thereon or therefor.

TECHNICAL FIELD

This invention relates to gear assemblies and in particular to anti-backlash, planetary gear systems without a planet carrier.

BACKGROUND ART

Many different gear systems are known in the prior art. One such system is a simple epicyclic gear train or planetary gear system. The planetary gear system consists of a sun gear, 1 or more planetary gears, a ring or annulus gear and a carrier for the planet gears. The number of planet gears varies considerably in actual practice; with some ratios it has been possible to utilize as many as twenty planet gears, while sometimes as few as one is used for light load applications. Planetary gear systems are widely used because they are compact, strong and have no non-linearities between their input and outputs. Their drawbacks are that they do not provide high torque amplification and are not anti-backlash.

Another type of prior art gear system is the harmonic drive. Harmonic drives consist of a wave generator, a flex spline and a circular spline, and are either cup type or pancake type drives. When the wave generator is rotated, it presses against the flex spline in two diametrically opposite points and distorts the flex spline in the process. This distortions force the gears on the outside of the flex spline to push on their opposite number gears on the inside of the circular spline. This, in turn, causes the two splines to rotate with respect to each other. This mechanism is essentially frictional, but with the motion from the inside out, the engagement angles are very steep and efficiency and torque multiplication is very good, especially for the cup type. Harmonic drives are, however, subject to ratchetting under large loads as they only engage two gear teeth at a time. The flex spline can deform under load which makes it easier for the teeth to yield. The flex spline is also prone to overstressing, and lubrication can be a concern. Harmonic drives have nonlinear harmonic distortions in the relationship between their input and output motions which complicates control factors. They are nearly anti-backlash, although they do have a small amount. The pancake version, although compact, has low efficiency and lubrication problems, while the cup type, though efficient and easier to lubricate, has long axial lengths and thus not compact.

Anti-backlash gears are commonly configured as two identical gears joined together by a torsion spring. These gear halves counter-rotate until each seats on the opposite face of the respective gear teeth it is fitted to. For very light loads, this acts as an anti-backlash system. For larger loads, however, the spring is easily overpowered and a situation exists where one of the gears takes the full force of the load first.

STATEMENT OF THE INVENTION

It is therefore an object of the present invention to provide a compact carrier-less planetary gear system capable of handling large loads.

A further object of the invention is to provide an anti-backlash planetary gear system.

A still further object of the invention is to provide a gear system that has mechanical advantages equal or superior to harmonic drives without the disadvantages of harmonic drives.

These and other objects are achieved by providing a planetary drive system that eliminates the planet gear carrier and eliminates backlash. In the present invention a sun gear rotates and drives an even number of planet gears (four or more). The rotating ring or annulus gear is split into two halves, as are the planet gears. A lower planet gear rotates and revolves around the sun gear as well as the lower annulus gear (which serves as a ground) while the upper planet gear, driven by its lower planet gear, drives the upper annulus gear (which is also the output gear) and a speeder gear. The speeder gear is free-floating directly above the sun gear and acts to keep the planet gears from tipping under large loads and permits the device to handle such loads smoothly and efficiently. Backlash is eliminated by slightly separating the upper and lower planet gears by the use of a preload spring, which preloads the upper and lower planet gears against the sun gear and annulus gears.

DETAILED DESCRIPTION OF THE INVENTION

Figure 1:
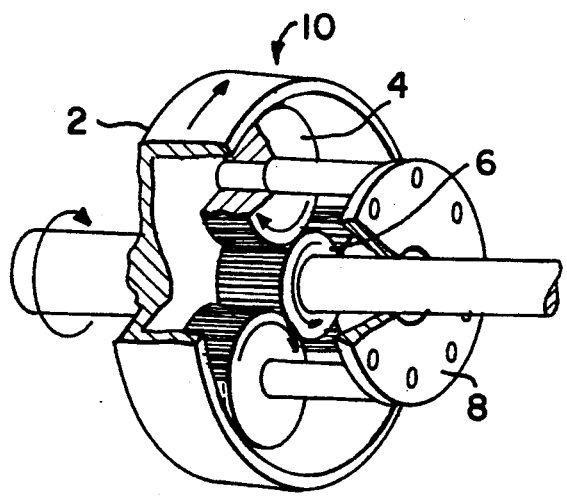
FIG. 1 is a perspective view of a typical prior art simple epicyclic gear train.

FIG. 1 shows a perspective view of a typical prior art simple epicyclic gear train 10, which consists of a rotating ring or annulus gear 2, three planet gears 4, a sun gear 6, and a planet carrier 8. FIG. 1 shows only three planet gears 4; typically, three planet gears 4 are employed when the system uses a carrier to distribute the loads equally between the three gears (the three planet gears and the carrier contacting them through a hole in their center will stabilize each in six degrees of freedom). However, the number of planets 4 can vary considerably in actual practice. With some ratios it has been possible to use as many as twenty planets 4, while sometimes as few as one planet 4 is used for light load applications. Those skilled in the art will recognize there are many different variations of gear train 10 available for use.

Figure 2:
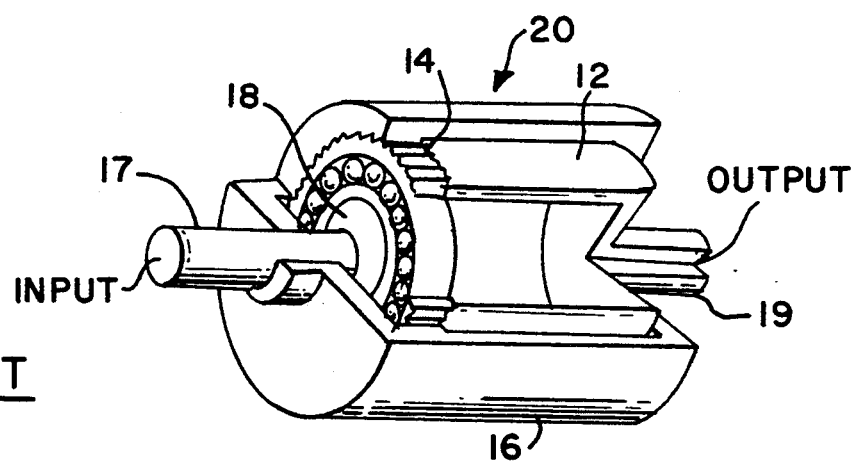
FIG. 2 is a perspective view of a typical prior art harmonic gear drive system.

FIG. 2 shows a perspective view of a typical prior art harmonic gear drive system 20, which consists of a tube 12 having a flexible gear 14 thereon, a stationary housing 16, an input shaft 17 connected to an elliptical cam 18 rolling within bearings, and an output shaft 19. The teeth on tube 12 and stationary housing 16 are straight-sided, and both gears have the same circular pitch, hence the areas of engagement are in full mesh. The flexible inner gear 14 has fewer teeth than the outside gear on stationary housing 16, therefore its pitch circle is smaller. The elliptical cam 18 rotates within flexible gear 14 causing it to mesh with the gears on stationary housing 16 progressively at diametrically opposite points. This propagates a traveling strain, or deflection wave in the flexible gear 14, hence the tradename Harmonic Drive. If motion of the elliptical cam 18 is clockwise, and the stationary housing 16 is held fixed, the flexible gear 14 will rotate counterclockwise at a slower rate, with a constant angular velocity.

Figure 3:
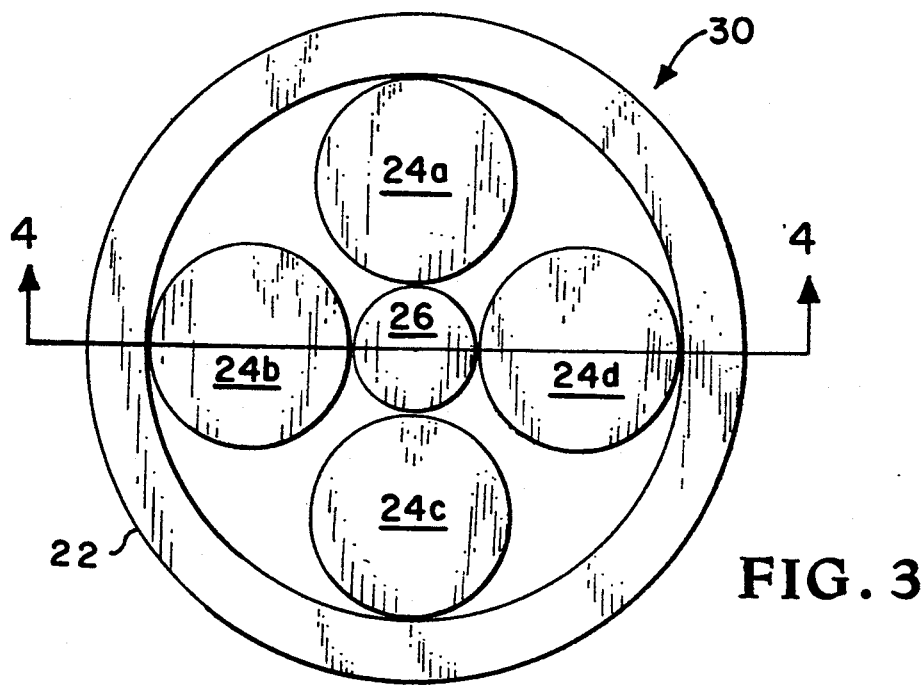
FIG. 3 is a top view (with the upper housing removed for clarity) of a carrier-less, anti-backlash planetary drive system according to the teachings of the present invention.

FIG. 3 is a top view (with the upper housing removed for clarity) of a carrier-less, anti-backlash planetary drive system 30 according to the teachings of the present invention. This view shows the arrangement of four planetary gears 24, specifically planetary gears $24_a$, $24_b$, $24_c$, and $24_d$, which mesh with annular gear teeth on lower housing 22 and with gear teeth on "speeder" gear 26. The operation of drive system 30 can best be understood by now referring to FIG. 4, which is a cross-section taken along lines 4—4, and described below.

Figure 4:
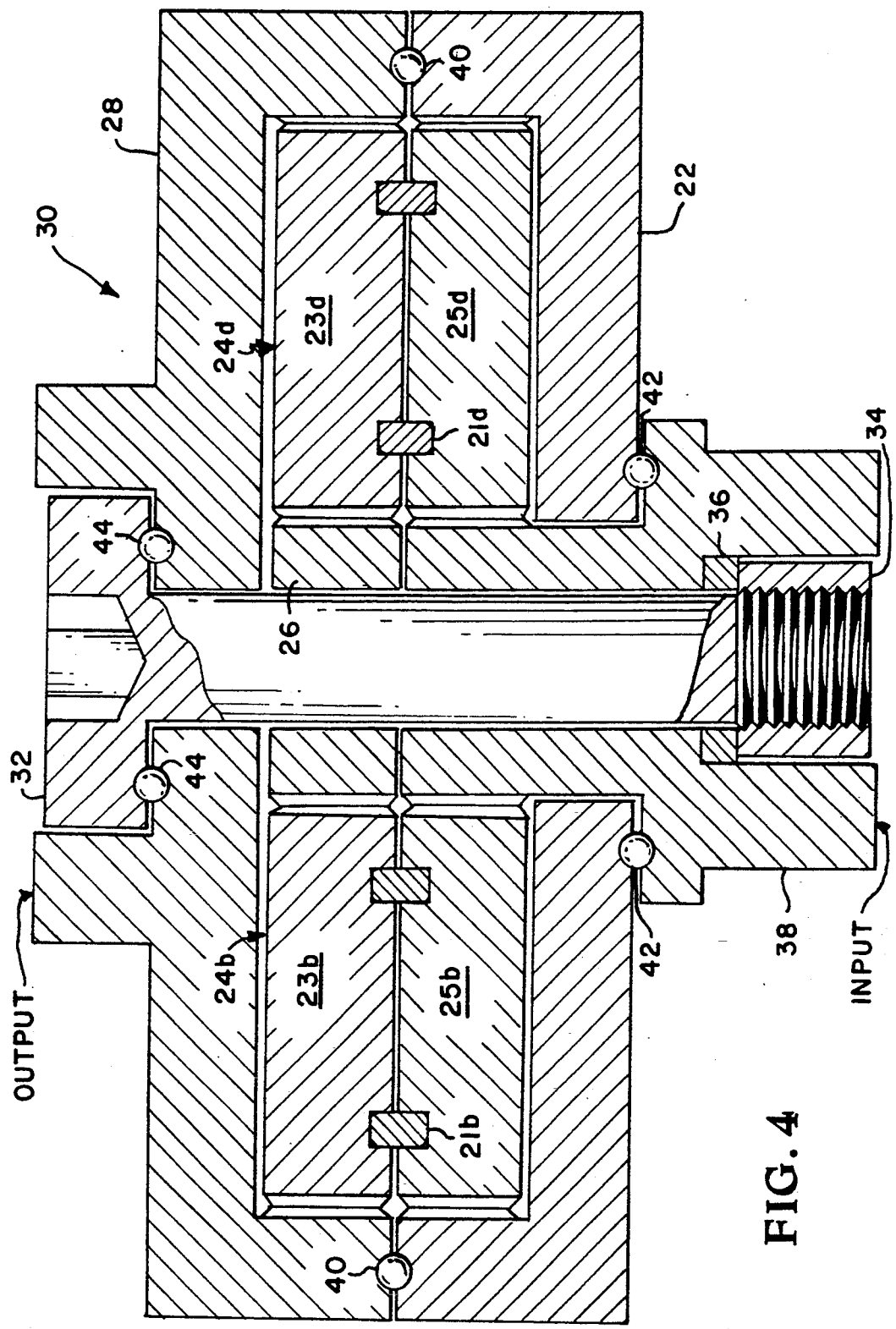
FIG. 4 is a cross-sectional view of the carrier-less, anti-backlash planetary drive system of FIG. 3.

FIG. 4 is a cross-sectional view along line 4—4 of the carrier-less, anti-backlash planetary drive system 30 shown in FIG. 3. In this figure it can be seen that system 30 consists of much more than the four planet gears 24, (although only planet gears $24_b$ and $24_d$ can be seen in this view), speeder gear 26, and lower housing 22. Also shown are the other main components of system 30 consisting of upper housing 28, input sun gear 38, and a preload bolt 32, tightened and held fixed against washer 36 by hex nut 34. It can also be seen that planet gears 24 each consist of an upper half and a lower half, specifically upper planet gear 23 and lower planet gear 25; in this figure, upper planet gear $23_b$, lower planet gear $25_b$, and upper planet gear $23_a$, lower planet gear $25_d$ can be seen, while upper planet gear $23_a$, lower planet gear $25_a$, and upper planet gear $23_c$, lower planet gear $25_c$ cannot be seen, although the combination of FIG. 3 with FIG. 4 makes it obvious to one skilled in the art that this is the configuration of system 30. The upper planet gears 23 are splined to lower planet gears 25 so they can move axially with respect to each other; this configuration will be explained later. Other components shown in this figure are bearings 42, which provide a low friction interface between input sun gear 38 and lower housing 22, bearings 40, which provide a low friction interface between lower housing 22 and upper housing 28, and bearings 44, which provide a low friction interface between upper housing 28 and preload bolt 32. The final component shown are the planet preload springs 21, specifically $21_b$ and $21_d$, which will be further described below.

The components shown in FIGS. 3 and 4 function as follows. Planet gears $24_a$, $24_b$, $24_c$ and $24_d$ are individually suspended between upper housing 28 and lower housing 22 to provide a no-backlash intimate coupling between the input and the output of drive system 30. Upper planet gears $23_a$, $23_b$, $23_c$ and $23_d$ are larger than lower planet gears $25_a$, $25_b$, $25_c$ and $25_d$. Thus, as input sun gear 38 is turned clockwise, planet gears $24_a$, $24_b$, $24_c$ and $24_d$ rotate counterclockwise. In doing so, lower planet gears $25_a$, $25_b$, $25_c$ and $25_d$ react against the annulus gearing in lower housing 22, and "push off" against the annulus gearing in lower housing 22 through upper planet gears $23_a$, $23_b$, $23_c$ and $23_d$ to drive the annulus gears in upper housing 28 counterclockwise. Since each of these gears are also orbiting in a clockwise manner about input sun gear 38, this slows the counterclockwise rotation of upper housing 28 drastically even while input sun gear 38 is turning rapidly. The net output motion is the difference between the two, can be made very small with respect to the input motion and is in the reverse direction of input sun gear 38. The entire system 30 is very efficient, involving essentially rolling friction. Thus, with a highly efficient system and small output motions for large input motions, we inevitably get very large output torques for small input torques.

The equations of motion for system 30 will provide a more thorough understanding of how the device works.

Efficiency × Work In = Work Out $$\alpha F_{in} R_s d\Theta = F_{out}(R_{pl} - R_{pu}) d\Phi \qquad (Eq. 1)$$

Where:
$\alpha$ = Device efficiency
$F_{in}$ = Force on the teeth of Input Sun Gear 38
$R_S$ = Radius of Input Sun Gear 38
$F_{out}$ = Force on the teeth of the annulus gear in upper housing 28
$d\Theta$ = Incremental angle of rotation of Input Sun Gear 38
$d\Phi$ = Incremental angle of rotation of each Planet Gear 24
$R_{pl}$ = Radius of each Lower Planet Gear 25
$R_{pu}$ = Radius of each Upper Planet Gear 23

$$\alpha T_{in} d\Theta = F_{out}(R_{pl} - R_{pu}) d\Phi \qquad (Eq. 2)$$

$$F_{out}(R_s + R_{pl} + R_{pu}) = T_{out} \qquad (Eq. 3)$$

$$T_{out}/T_{in} = \alpha(R_s + R_{pl} + R_{hd\ pu}) d\Theta / (R_{pl} - R_{pu}) d\Phi \qquad (Eq. 4)$$

Where:
$R_{pl} d\Phi$ = Movement of Planet Center
$(R_{pl} - R_{pu}) d\Phi$ = Output Travel
$R_s d\Theta = 2R_{pl} d\Phi$ $$T_{out}/T_{in} = \alpha 2 R_{pl}(R_s + R_{pl} + R_{pu}) / R_s(R_{pl} - R_{pu}) \qquad (Eq. 5)$$

Examining Eq. 5, above, it can be seen that with the upper planet gear 23 larger in radius than the lower planet gear 25, the torque mechanical advantage will be negative and, hence, we have an output moving in the reverse direction of the input. Equation 1 shows the differential motion nature of the device and the denominator of equation 5 shows how this relates to torque mechanical advantage. Clearly, a small differential motion will result in extraordinary torque mechanical advantages. The discussion to this point does not indicate why the differential motion must be opposite the direction of the input motion. The answer to this question would be best answered after the discussion on anti-backlash below.

Figure 9:
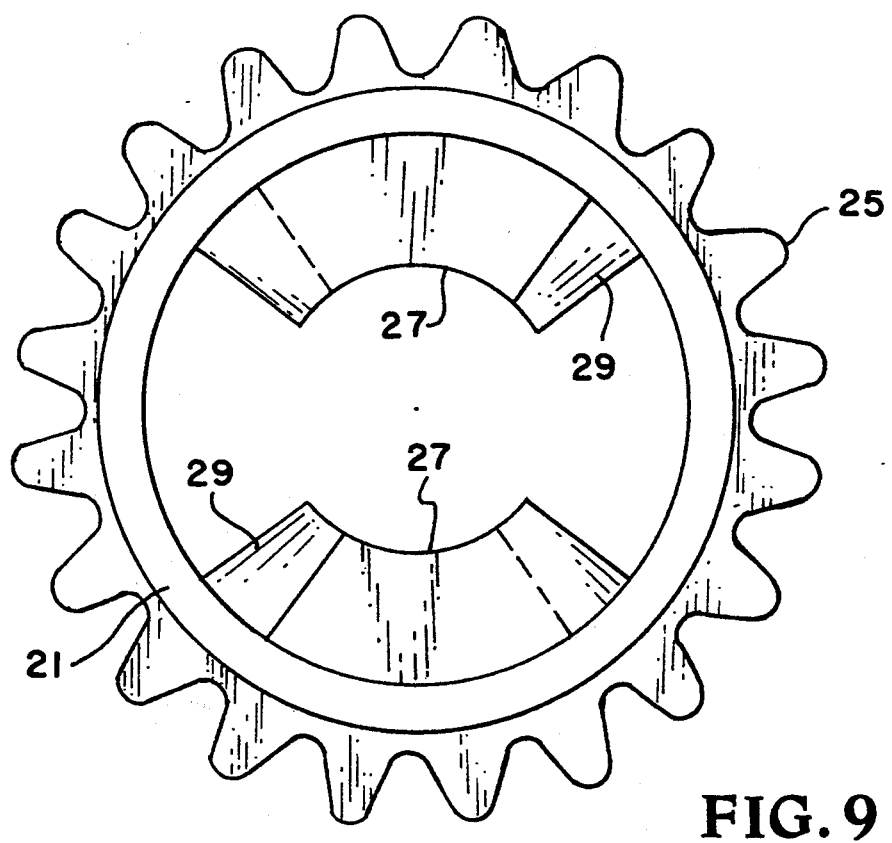
FIG. 9 is a top view of the lower planet gear used in the FIG. 4 embodiment.

The Carrier-Less, Anti-Backlash Planetary Drive System 30 is a true anti-backlash system, whereas the common configuration for an anti-backlash system is not. As shown in FIG. 4, each planet gear 24 is split into two halves, upper planet gear 23 and lower planet gear 25. As shown in FIG. 9, these halves are splined together by angled interlocking splines 27 known as preload splines, such that when the assembled halves are spread apart by preload spring 21, they will rotate slightly with respect to each other. This slight rotation produces the anti-backlash contacts needed. Because the preload angle of surface 29 is very small, on the order of 6 degrees, it is a locking angle. Therefore, as an anti-backlash planet gear 24 encounters opposing torque, the frictional forces between the mating splines builds up faster than those attempting to counter-rotate and stress relieve the planet halves. As a result, these halves stay locked in their initial contact position and we have a true anti-backlash system. For these reasons, even numbers of planet gears 24 are required, with the minimum number being four, as every other one is preload biased opposite to its neighbor, i.e., clockwise then counterclockwise, etc. This arrangement means that only half of planet gears 24 are load bearing at any one time. It is also important to note that in this embodiment the speeder gear 26 is used to prevent the upper half of each planet gear 24 from being pushed inward by reactions from the large loads encountered in the transmission of torque. Speeder gear 26 also prevents planet gears 24 from tipping backwards under large loads. This would cause rough running and adversely effect efficiency, load capability, wear and precision control.

On the one hand, a small preload angle is required between the preload splines 27 of the planet halves; on the other hand, we do not want large spreading between the planet halves as they twist with respect to each other to take out the backlash. This apparent contradiction is solved by introducing a deliberate misalignment (or offset) between the upper and lower planet gears and allowing the planet gear twist adjustment to be compensated for by manufacturing tolerances. The equations below illustrate this approach.

$$B_e \approx \frac{B_{Ip} + B_{up}}{2} + \Delta BP_{I,u} \quad (Eq. 6)$$

Where:
$B_e$ = Effective backlash between Input and Output (Total Backlash)
$B_{Ip}$ = Backlash between Sun Gear, lower planet gear and lower housing
$B_{up}$ = Backlash between Speeder gear, Upper Planet Gear and Lower Housing
$\Delta BP_{I,u}$ = Backlash between Upper and Lower Planet Gears $$B_o = B_e - \Delta B_p \quad (Eq. 7)$$

Where:
$B_o$ = Backlash Offset; the deliberate offset between upper and lower planet gears
$\Delta B_p$ = Backlash adjustment.

$$\Delta B_p = \Delta h \tan \Phi \quad (Eq. 8)$$

Where:
$\Delta h$ = Distance the upper and lower planet gears must separate to provide backlash adjustment
$\Phi$ = Preload tab contact angle.

Alternate Embodiments of the Invention

Figure 8:
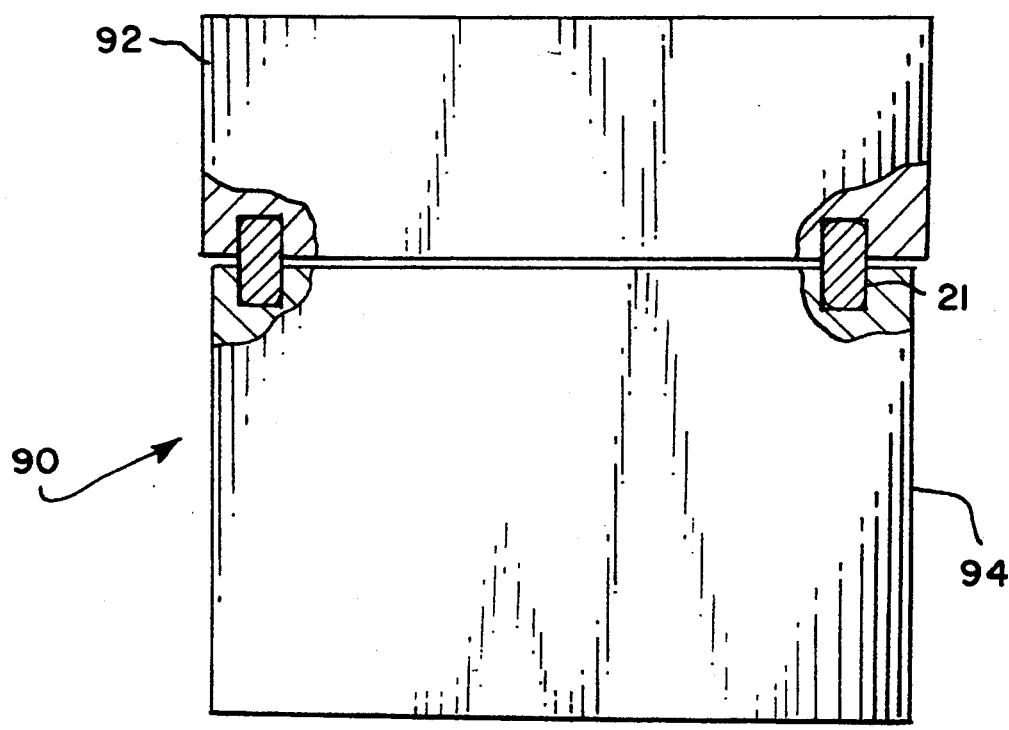
FIG. 8 is an alternate embodiment of a planet gear used in the carrier-less, anti-backlash planetary drive system according to the teachings of the present invention.

FIG. 8 illustrates an alternate embodiment of a planet gear 90 which will allow for the elimination of speeder gear 26 of FIG. 4. In this embodiment, lower planet gear 94 has an axial length twice or more than that of upper planet gear 92. Thus, lower planet gear 94 will be supported against tipping towards the center of the transmission system, and tipping backwards under large loads. As in the preferred embodiment, a preload spring 21 is used to separate the upper and lower planet gears. Various known gear tooth designs on the upper and lower planet gears may be selected to balance the forces in this embodiment.

Figure 5:
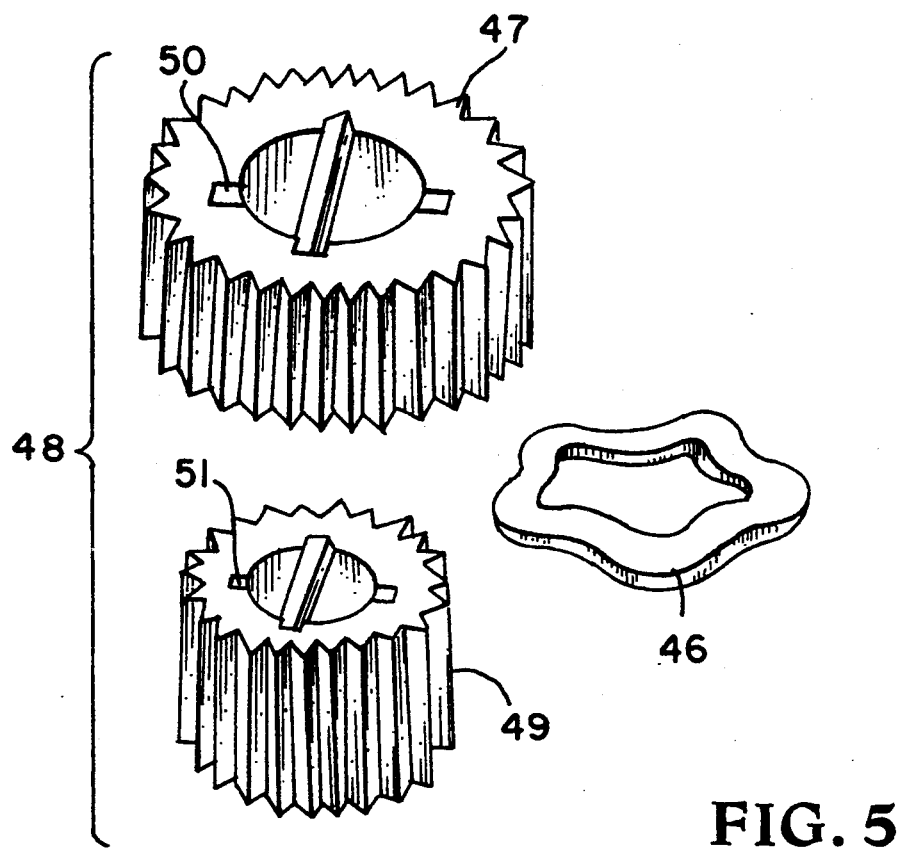
FIG. 5 is a perspective view of an alternate embodiment for preloading the planet gears of a carrier-less, anti-backlash planetary drive system according to the teachings of the present invention.

FIG. 5 is a perspective view of an alternate embodiment for preloading the planet gears of the carrier-less, anti-backlash planetary drive system 30. As shown, planet gear 48 consists of upper planet gear 47, which has four rifling grooves 50, and lower planet gear 49, which has four rifling grooves 51. These rifling grooves will mate with rifling guides on a torsion bar (see FIG. 6). Between upper planet gear 47 and lower planet gear 49 is preload spring 46, which can be a standard wave spring. This embodiment provides for a controlled spring constant and internal compliance to make the distribution of loads between the upper and lower planet gears more equitable and precise. With independently preloaded planets, any even number of planets will suffice as long as the number is four or more, which will increase the strength of the transmission.

Figure 6:
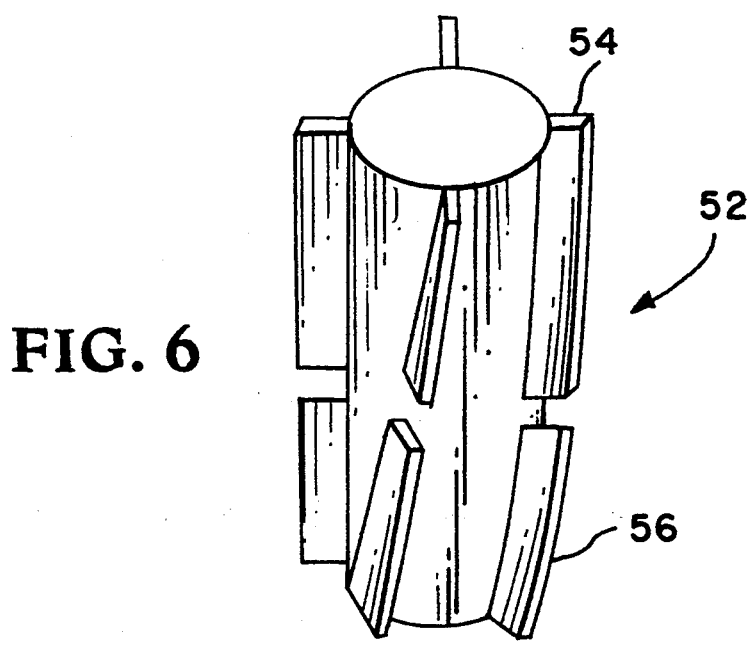
FIG. 6 is a perspective view of a preload torsion bar used in the alternate embodiment for preloading of FIG. 5.

FIG. 6 is a perspective view of the preload torsion bar 52 used in the alternate embodiment for preloading shown in FIG. 5. Preload torsion bar 52 has four upper rifling guides 54, to mate with the four rifling grooves 50 on upper planet gear 47, and four lower rifling guides 56, to mate with the four rifling grooves 51 on lower planet gear 49. When all these components are assembled together, it will be apparent to one skilled in the art that preload spring 46 will cause the two planet hanes 47 and 49 to separate, and because rifling guides provide a "twist" to the two planet halves, this will provide the anti-backlash preload described earlier.

Figure 7:
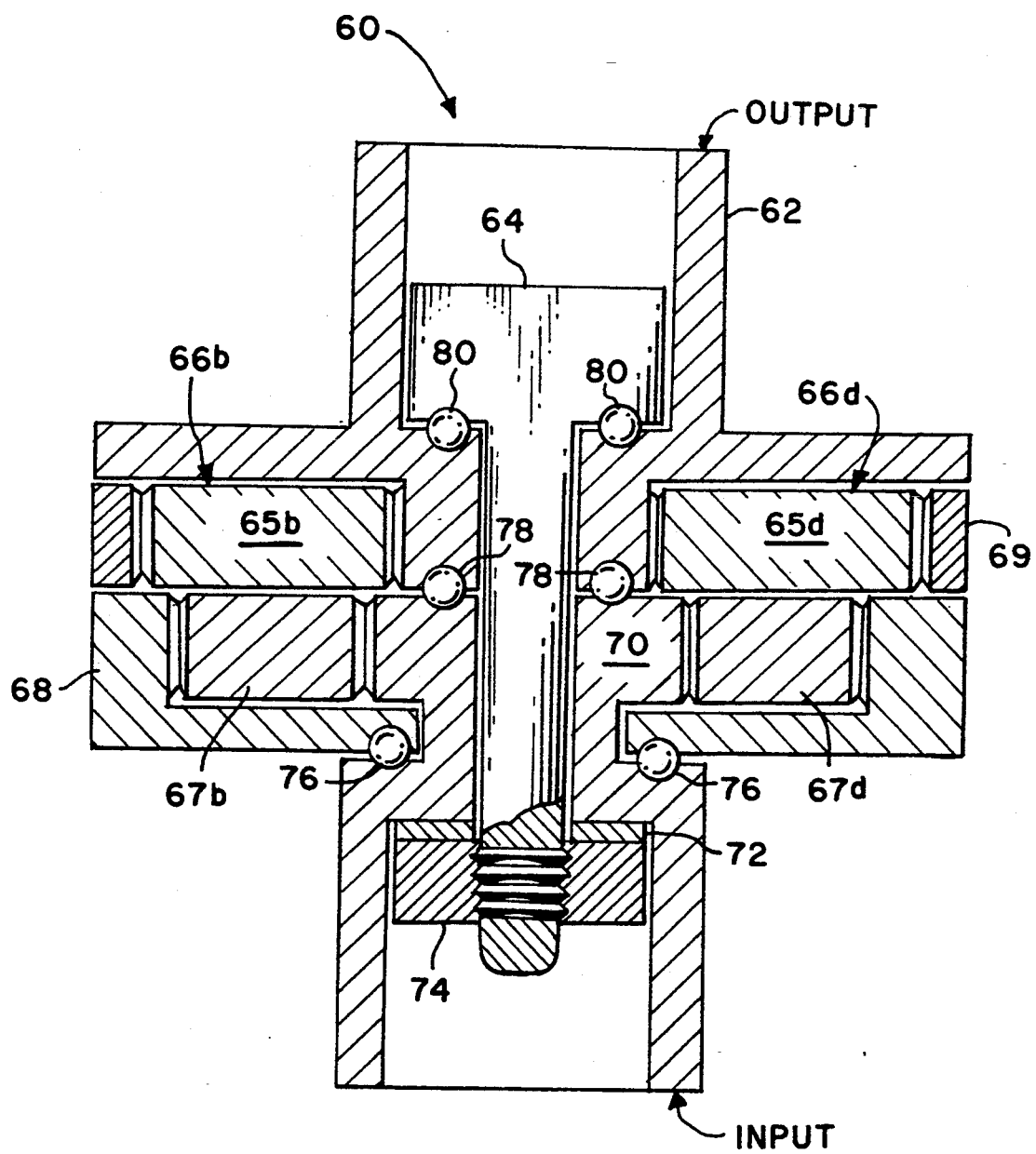
FIG. 7 is an alternate embodiment of a carrier-less, anti-backlash planetary drive system according to the teachings of the present invention. Instead of being a speed reducer it is a speed increaser.

FIG. 7 is an alternate embodiment of a carrier-less, anti-backlash planetary drive system 60 according to the teachings of the present invention. In this embodiment, speeder gear 62 now serves as the output with very high speed multiplication. System 60 consists of input sun gear 70 which meshes with lower planet gears 67 (only lower planet gears 67$_b$ and 67$_d$ are shown). Lower planet gears 67 in turn mesh with the annular gearing on fixed gear 68. Upper planet gears 65 (only upper planet gears 65$_b$ and 65$_d$ are shown) mesh with planet alignment annular gear 69 and speeder gear 62 which provides the output. A preload bolt 64 hold the components together and is fixed by nut 74 which bears against washer 72. Bearings 76, 78 and 80 are provided and serve the same purpose as described in FIG. 4. Planet gears 66 (only planet gears 66 and 66a are shown) are preloaded for anti-backlash by one of the methods previously described. This is a very compact and efficient package with no backlash, no carrier, and outstanding strength.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A carrier-less, anti-backlash planetary gear system comprising:
   an input sun gear;
   a split ring gear comprised of a fixed ring gear disposed coaxially of said sun gear and a rotating ring gear also disposed coaxially of said sun gear;
   means for securing said split ring gear;
   an even plurality of planet gears disposed between said split ring gear and said sun gear;
   each said planet gear comprised of an upper planet gear, a lower planet gear and a means for causing separation and relative twist between said upper and lower planet gears;
   said lower planet gear meshing with said input sun gear and said fixed ring gear;
   said upper planet gear driven by said lower planet gear and meshing with said rotating ring gear.

2. The gear system of claim 1 further comprising an additional gear coaxial with said sun gear and meshing with each said upper planet gears.

3. The gear system of claim 1 wherein means for causing separation and relative twist between said upper and lower planet gears comprises said upper planet gear splined to said lower planet gear with an angled spline and a spring between said upper and lower planet gears.

4. The gear system of claim 1 wherein means for causing separation and relative twist between said upper and lower planet gears comprises a plurality of rifling grooves within said upper and lower planet gears and a splined torsion bar disposed within said rifling grooves with a spring between said upper and lower planet gears.

5. The gear system of claim 3 wherein said lower planet gear has an axial length twice or more than that of said upper planet gear.

6. A carrier-less, anti-backlash planetary gear system comprising:
   an input sun gear;
   a fixed ring gear disposed coaxially of said sun gear;
   an output gear disposed coaxially of said sun gear;
   an even plurality of planet gears disposed between said ring gear, said sun gear and said output gear;
   each said planet gear comprised of an upper planet gear, a lower planet gear and a means for causing separation and relative twist between said upper and lower planet gears;
   said lower planet gear meshing with said input sun gear and said fixed ring gear;
   said upper planet gear driven by said lower planet gear and meshing with said output gear.

7. The gear system of claim 6 wherein means for causing separation and relative twist between said upper and lower planet gears comprises said upper planet gear splined to said lower planet gear with an angled spline and a spring between said upper and lower planet gears.

8. The gear system of claim 6 wherein means for causing separation and relative twist between said upper and lower planet gears comprises a plurality of rifling grooves within said upper and lower planet gears and a splined torsion bar disposed within said rifling grooves with a spring between said upper and lower planet gears.

* * * * *